United States Patent [19]
Matsubara

[11] 4,045,127
[45] Aug. 30, 1977

[54] ENLARGING LENS SYSTEM
[75] Inventor: Masaki Matsubara, Hachiouji, Japan
[73] Assignee: Olympus Optical Co., Ltd., Tokyo, Japan
[21] Appl. No.: 641,171
[22] Filed: Dec. 16, 1975
[30] Foreign Application Priority Data
   Dec. 17, 1974  Japan .................. 49-144171
[51] Int. Cl.² .................................. G02B 9/60
[52] U.S. Cl. .................. 350/210; 350/215; 350/218
[58] Field of Search ............ 350/218, 210, 214, 215
[56] References Cited
U.S. PATENT DOCUMENTS
2,319,171  5/1943  Warmisham ................ 350/218
2,878,723  3/1959  Herzberger ................ 350/218
3,556,643  1/1971  Tibbetts et al. ............. 350/218

Primary Examiner—John K. Corbin
Assistant Examiner—Conrad Clark
Attorney, Agent, or Firm—Cushman, Darby & Cushman

[57] ABSTRACT

A large-aperture enlarging lens system which comprises a first positive meniscus lens component, a second positive meniscus lens component, a third lens component consisting of two lens elements, a fourth lens component consisting of two lens elements and a fifth positive lens component, either one of said third and fourth lens components arranged on both sides of a stop having a convex lens on the side of said stop, and wherein aberrations are favorably corrected.

6 Claims, 23 Drawing Figures

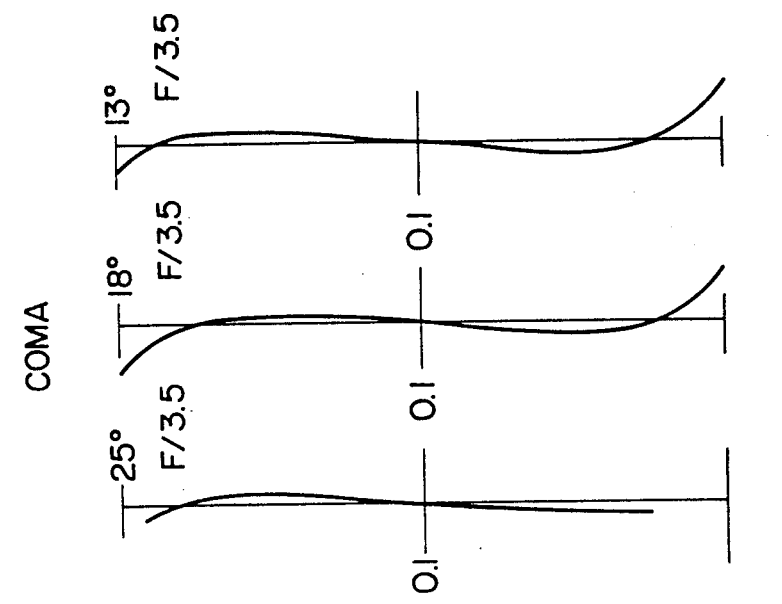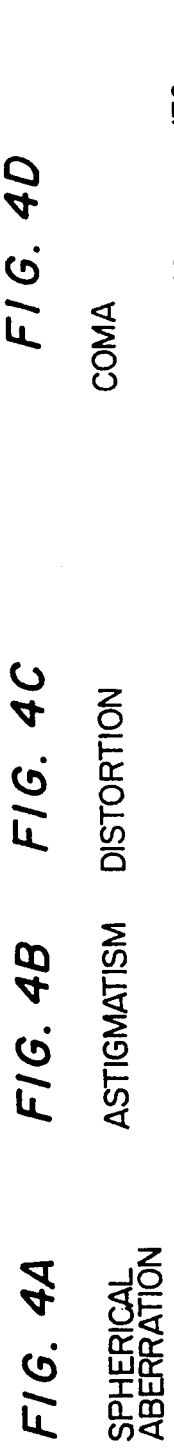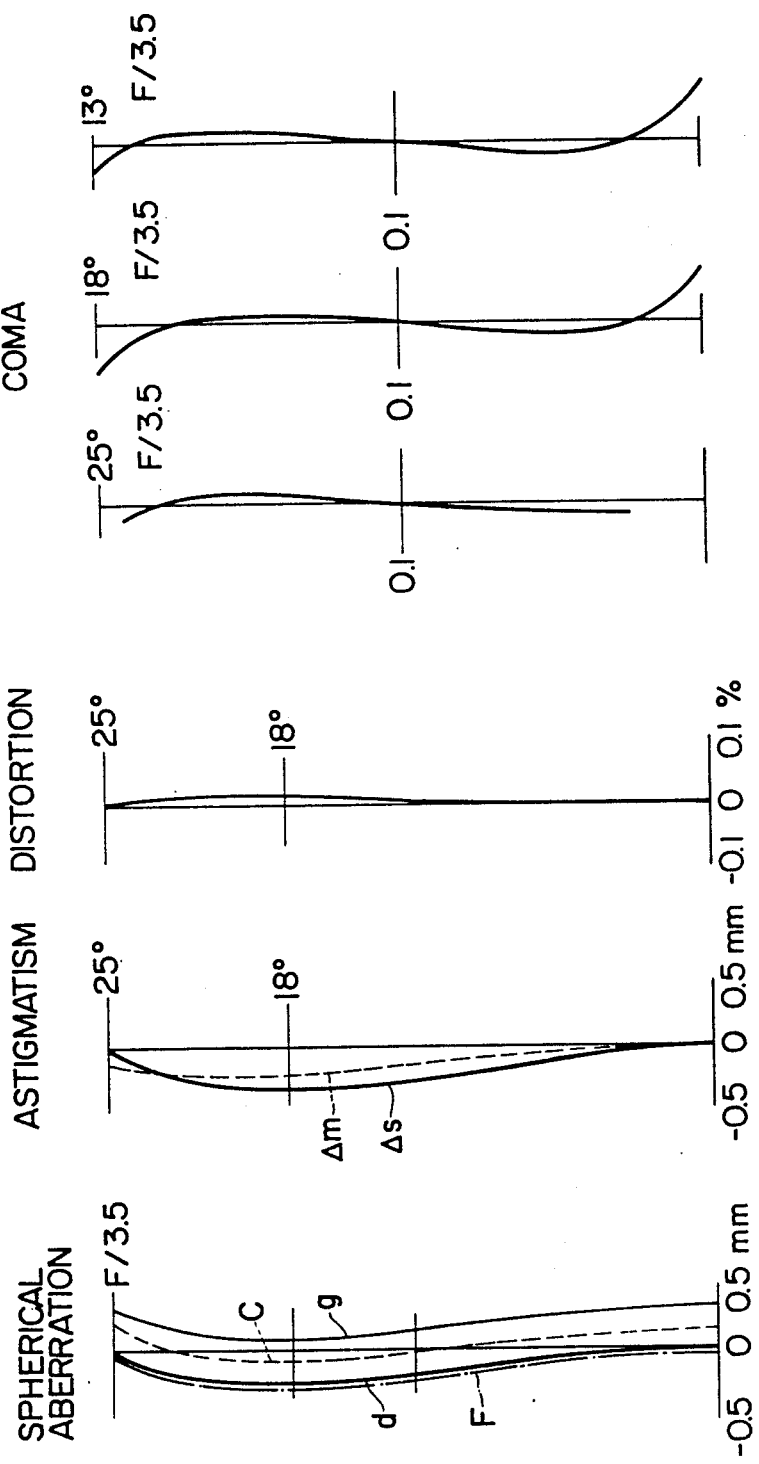

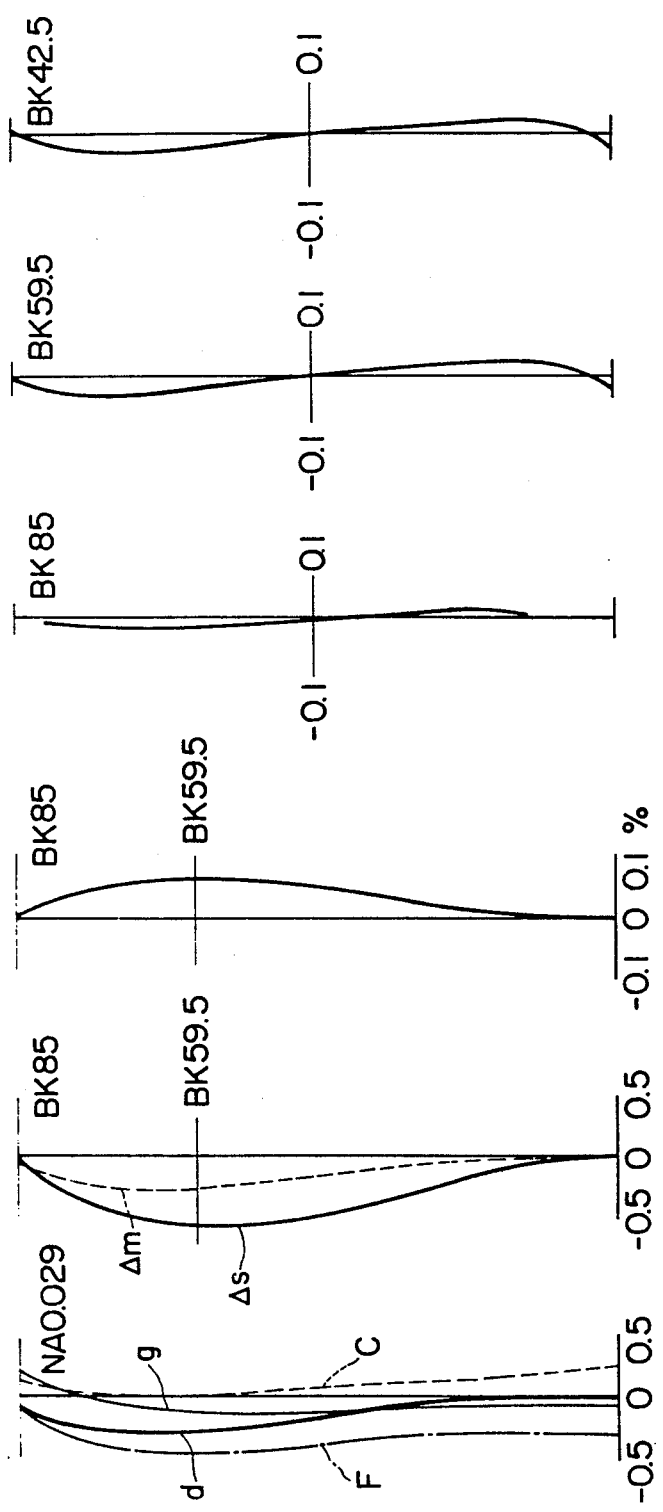

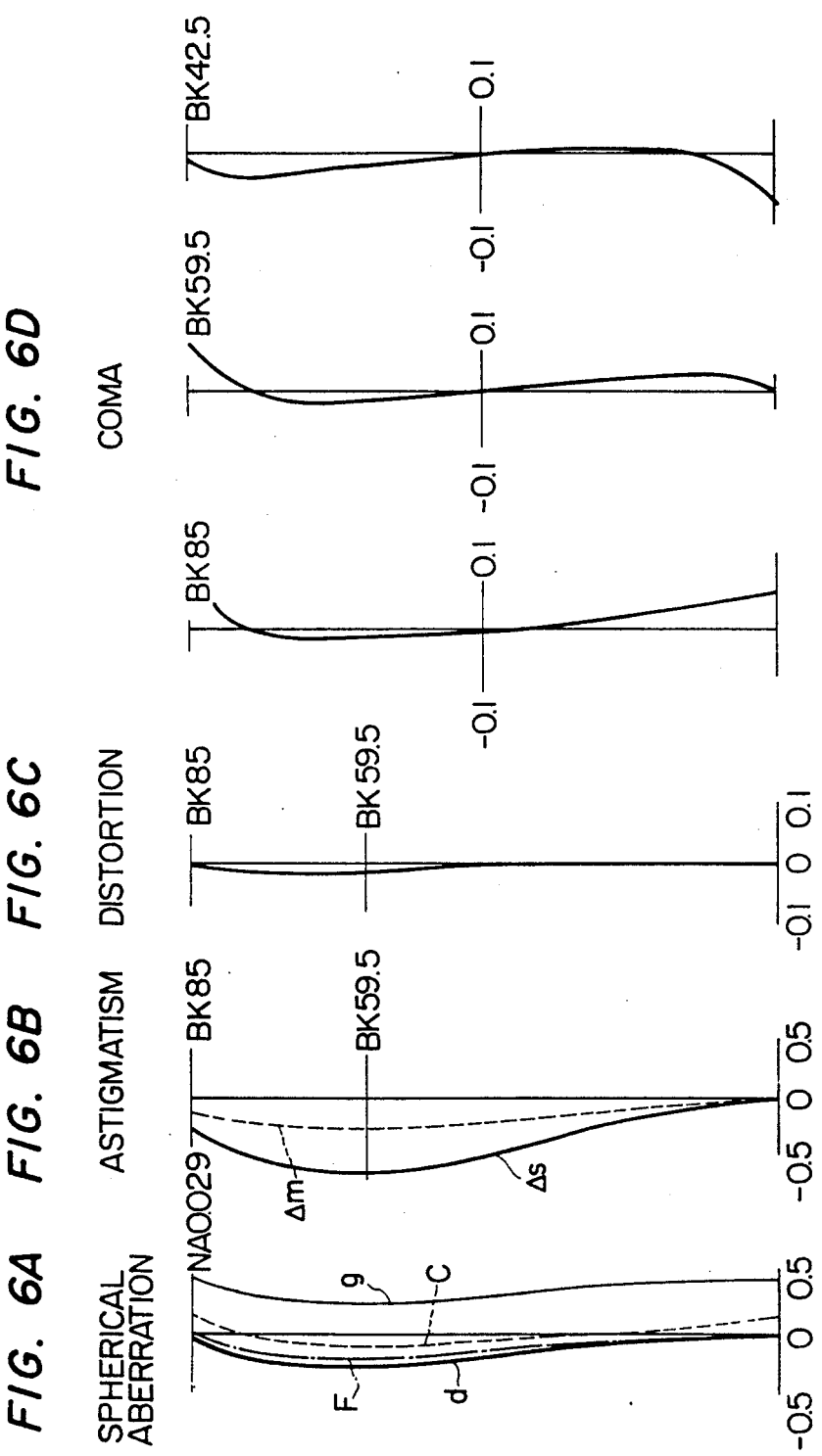

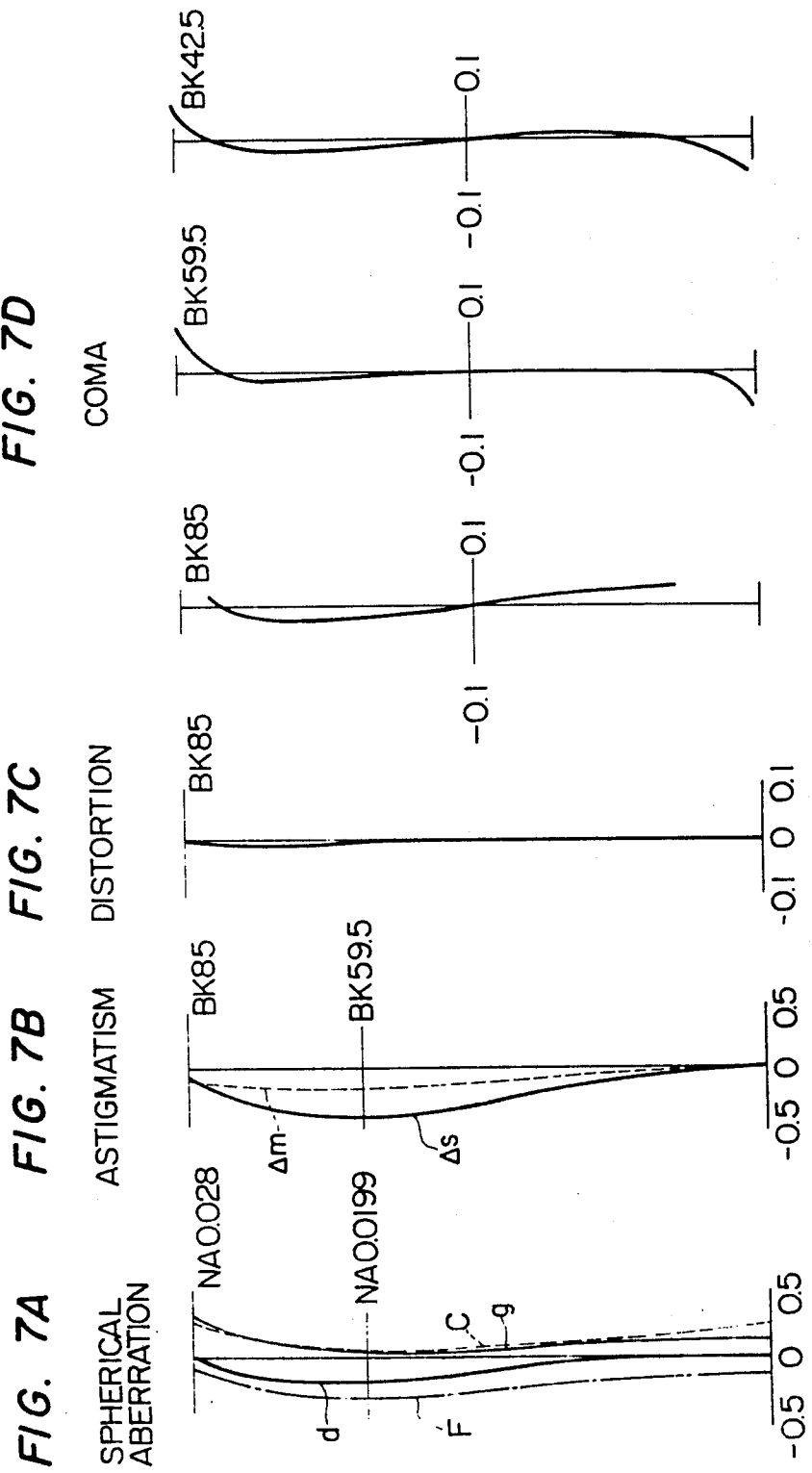

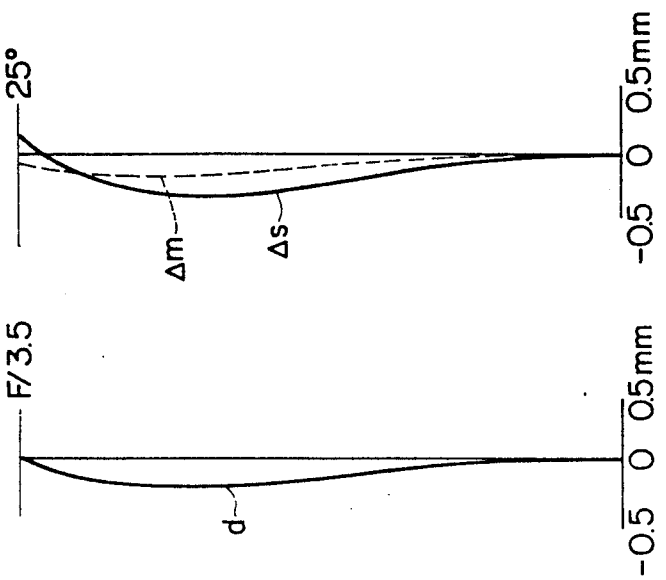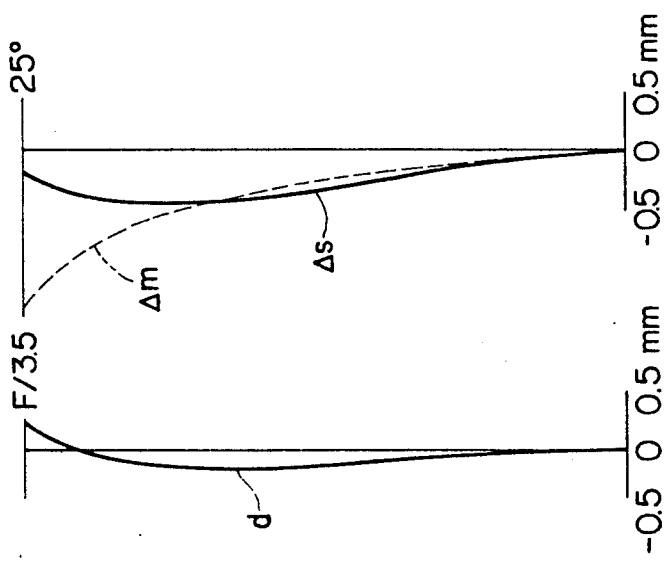

ENLARGING LENS SYSTEM

BACKGROUND OF THE INVENTION

1. Field of the Invention

The present invention relates to an enlarging lens system for photomechanical process.

2. Description of the Prior Art

Unlike general photographic lenses, lens systems for photomechanical process must be so designed as to uniformly correct various aberrations when objects at short distance are photographed since such lens systems are used for copying plane objects at short distance with high fidelity. Lens systems for photomechanical process must assure high image flatness and little distortion especially on large image planes. For satisfying these requirements, lens systems for photomechanical process must have long focal length and, therefore, it becomes rather difficult to design lens systems having large aperture ratios. Especially in case of enlarging lens systems, however, they should preferably have aperture ratios as large as possible since light intensity is attenuated so much during half-tone separation, masking, etc. in the photographing process that a long exposure time is required. Especially on a large image plane, image flatness is degraded and satisfactory images may not be obtained in circumferential areas.

SUMMARY OF THE INVENTION

It is therefore a general object of the present invention to provide an enlarging lens system for photomechanical process which has magnification of 2× to 8×, aperture ratio of F/3.5, field angle of 50° and wherein aberrations for objects at short distances are favorably corrected.

The enlarging lens system according to the present invention comprises five components of seven lenses: a first positive meniscus lens component, a second positive meniscus lens component, a third and a fourth lens component each consisting of two lens elements which are cemented or arranged with a narrow airspace therebetween and a fifth positive meniscus lens component. The enlarging lens system according to the present invention is characterized in that a cemented lens component having a convex lens on the side of the stop is used at least as one of the third and fourth lens components which are arranged on both sides of the stop. In the third or fourth lens component comprising a convex lens on the side of the stop as described above, the convex lens has a higher refractive index than the other concave lens for minimizing Petzval's sum, correcting curvature of field and assuring image flatness even on circumference of image plane. The other of the third or fourth lens component, (i.e., the fourth lens component when the third lens component has a convex lens on the stop side or the third lens component when the fourth lens component has a convex lens on the side of the stop) consists of a concave lens arranged on the side of the stop and a convex lens which is cemented to the concave lens or arranged with an airspace from the concave lens. Further, the surface nearest the stop has a radius of curvature as large as possible so as to prevent spherical aberration from being aggravated even when a large aperture ratio is selected without increasing off-axial astigmatism and coma.

Furthermore, the fifth lens component consists of lenses having refractive indices as high as possible for correcting spherical aberration. Finally, considerations are taken to keep a proper balance in refractive power distribution between the front and rear lens groups with regard to the position of the stop so as to favorably correct distortion.

The enlarging lens system according to the present invention is designed on the fundamental conceptions described above. Speaking more concretely, the above-mentioned five groups of seven lenses are so arranged as to satisfy the following conditions:

$$n_b < n_a \tag{1}$$

$$0.8f < f_a < 2.5f \tag{2}$$

$$0.04 < n_c - n_d < 0.12 \tag{3}$$

$$n_7 > 1.70, \nu_7 > 46 \tag{4}$$

$$0.6 < f_{II}/f_I < 1.6 \tag{5}$$

wherein the reference symbols represent as defined below:

$n_a$, $n_b$ and $f_a$: refractive indices of the lens elements of the third or fourth lens component which comprises a convex lens on the side of the stop ($n_a$ denotes refractive index of the convex lens) and focal length of the lens component $n_c$ and $n_d$: refractive indices of the lens elements of the third or fourth lens component which does not comprise a convex lens on the side of the stop ($n_c$ denotes refractive index of the lens arranged on the side of the stop)

$n_7$ and $\nu_7$: refractive index and Abbe's number of the fifth lens component $f_I$ and $f_{II}$: focal lengths of the front and rear lens groups which are arranged before and after the stop respectively Now, the significance of the above-mentioned conditions will be described consecutively below:

Conditions (1) and (2) are required for the cemented lens component which is arranged nearest the stop and comprises a convex lens on the side of the stop. When $n_a$ is smaller than $n_b$ in condition (1), correcting function of Petzval's sum is reversely effective and degrades image flatness. It is further desirable to select $n_a$ below 1.76. If $f_a$ exceeds the upper limit of condition (2), such a long focal length is advantageous for correcting Petzval's sum with the convex lens but requires shorter radius of curvature on the surface facing the stop, thereby resulting in aggravation in spherical aberration and coma produced by off-axial rays. When $f_a$ is below the lower limit of condition (2), the correcting function of Petzval's sum is weakened to make it impossible to obtain the desired image flatness.

Condition (3) is effective for preventing spherical aberration from being produced while avoiding aggravation in off-axial astigmatism and coma by giving a refractive index as high as possible to the stop side concave lens, thereby enlarging the radius of curvature on the surface facing the stop in the lens component other than that comprises the above-mentioned convex lens arranged of the stop side. If the factor of $n_c - n_d$ exceeds the upper limit in condition (3), off-axial aberration can be favorably corrected but spherical aberration is produced since the cemented surface (or the airspace side surface of the concave lens when this lens component consists of two lenses arranged with an airspace interposed therebetween) of this lens component has a positive power. When this concave lens has too high a refractive index, the correcting function of Petzval's sum is weakened. If the factor $n_c - n_d$ is below the lower limit of condition (3), the concave lens has a low refractive index which is advantageous for correcting Petzval's sum but radius of curvature is so enlarged on the surface facing the stop as to produce off-axial aberration, making it difficult to correct off-axial aberration in the lens system.

In the enlarging lens system according to the present invention, spherical aberration is favorably corrected by selecting the refractive index and Abbe's number within the range defined by condition (4). When the fifth lens component has a refractive index $n_7 < 1.70$, spherical aberration is produced and can hardly be corrected by the other lenses. When Abbe's number $\nu_7$ is below 46, chromatic aberration, especially lateral chromatic aberration is produced at such a high rate as can hardly be corrected.

In practical use of lenses for plate making, a shutter is generally placed behind a lens system. Due to restriction imposed on cameras for plate making, i.e., for designing a small shutter, it is required to control the diameter of the rays passing the final surface of the lens system below a certain limit. For this purpose, it will be sufficient to select the distance from the stop to the final lens of the lens system as short as possible. Therefore, it is impossible to arrange a large number of lenses in the rear lens group and it is required to arrange the stop as close as possible to the rear lens group. When such an arrangement is adopted, however, the rear lens group must have a high power and it becomes impossible to correct various aberrations. In addition, due to the fact that the stop is not arranged at the center of the lens system, distortion is produced though it must be favorably corrected especially in lenses for plate making.

In the enlarging lens system according to the present invention, refractive power distribution is properly balanced with regard to the position of the stop between the front and rear lens components as defined by condition (5) for correcting distortion. When the factor $f_{II}/f_I$ exceeds the upper limit of condition (5), the rear lens group has too low a refractive power and positive distortion is produced. If $f_{II}/f_I$ is below the lower limit of condition (5) on the other hand, the front lens groups has a low refractive power to produce negative distortion and, in addition, the front lens group has a high refractive power to produce other aberrations, thereby making it impossible to keep proper balance among various aberrations in the lens system.

In addition to the above-mentioned five conditions, it is more preferable to reserve an airspace $d_s$ between the front and rear lens groups within the range defined by condition (6) below:

$$0.22f < d_s < 0.28f \quad (6)$$

Though it is advantageous to select a long airspace $d_s$ for favorably correcting coma, it must be selected below a certain upper limit for arranging the stop near the rear lens group as already described above. Further, it will also be impossible to select too long an airspace for properly balancing aberrations other than coma. When the airspace is shorter than the lower limit of condition (6), coma will be aggravated. In view of these requirements, it is desirable to select the airspace $d_s$ within the range defined by condition (6).

Enlarging lens systems are generally used not only at their design magnifications but also within certain ranges higher and lower than the design magnifications. When lenses are used at magnifications other than their design levels, aberrations, especially astigmatism are aggravated and image flatness is degraded due to general nature inherent in lenses. For preventing such aggravation and degradation, the present invention makes it possible to adopt a method for correcting aberrations by floating a certain lens so as to assure performance nearly equal to the design performance within a magnification range which is to be employed in practice.

BRIEF DESCRIPTION OF THE DRAWINGS

FIG. 4A through FIG. 4D show curves illustrating the aberration characteristic of the embodiment 1;

FIG. 5A through FIG. 5D show curves illustrating the aberration characteristic of the embodiment 2;

FIG. 6A through FIG. 6D illustrate graphs showing the aberration characteristic of the embodiment 3;

FIG. 7A through FIG. 7D illustrate graphs showing the aberration characteristic of the embodiment 4;

FIG. 8A and FIG. 8B show curves spherical aberration and astigmatism characteristics of the embodiment 1 when it is used at magnification 8× without correcting aberrations; and FIG. 9A and FIG. 9B show curves illustrating spherical and astigmatism characteristics of the embodiment 1 when it is used after correcting aberrations.

DETAILED DESCRIPTION OF THE PREFERRED EMBODIMENTS

Figure 1:
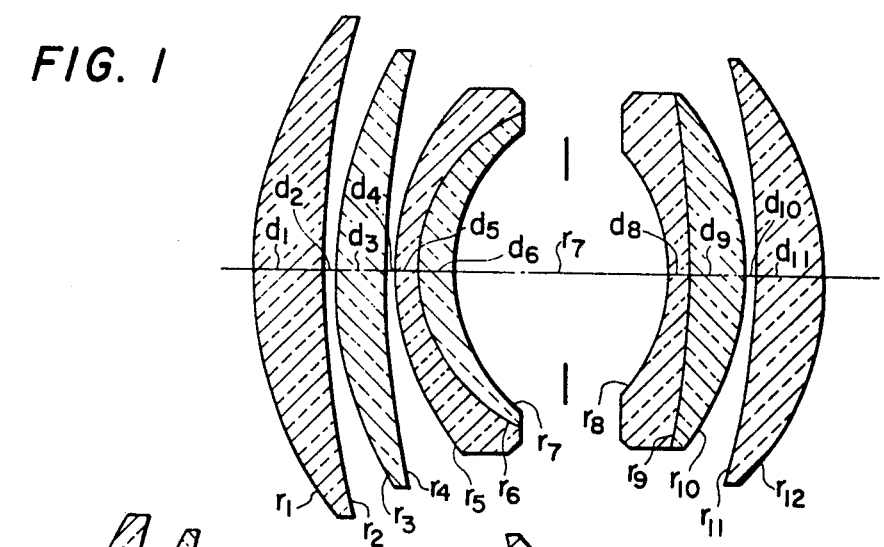
FIG. 1 through FIG. 3 show sectional views illustrating the compositions of the preferred embodiments of the present invention.

Some numerical data of the enlarging lens system according to the present invention will be exemplified below:

Embodiment 1

F/3.5, 2ω = 50°, f = 100

| | | | | | |
|---|---|---|---|---|---|
| $r_1 =$ | 42.015 | | | | |
| $d_1 =$ | 8.0 | $n_1 =$ | 1.5687 | $\nu_1 =$ | 63.2 |
| $r_2 =$ | 90.339 | | | | |
| $d_2 =$ | 1.33 | | | | |
| $r_3 =$ | 47.244 | | | | |
| $d_3 =$ | 5.67 | $n_2 =$ | 1.5687 | $\nu_2 =$ | 63.2 |
| $r_4 =$ | 97.570 | | | | |
| $d_4 =$ | 0.4 | | | | |
| $r_5 =$ | 31.282 | | | | |
| $d_5 =$ | 2.27 | $n_3 =$ | 1.5927 | $\nu_3 =$ | 35.3 |
| $r_6 =$ | 18.893 | | | | |
| $d_6 =$ | 3.87 | $n_4 =$ | 1.67 | $\nu_4 =$ | 57.3 |
| $r_7 =$ | 19.960 | | | | |
| $d_7 =$ | 23.67 | | | | |
| $r_8 =$ | −19.456 | | | | |
| $d_8 =$ | 2.0 | $n_5 =$ | 1.74 | $\nu_5 =$ | 31.7 |
| $r_9 =$ | −100.159 | | | | |
| $d_9 =$ | 6.67 | $n_6 =$ | 1.686 | $\nu_6 =$ | 49.2 |
| $r_{10} =$ | −29.407 | | | | |
| $d_{10} =$ | 0.27 | | | | |
| $r_{11} =$ | −82.624 | | | | |
| $d_{11} =$ | 7.47 | $n_7 =$ | 1.757 | $\nu_7 =$ | 47.9 |
| $r_{12} =$ | −35.199 | | | | |

$f_a = 214.5$, $f_{II}/f_I = 1.25$

Embodiment 2

F/3.5, 2ω = 50°, f = 100

| | | | | | |
|---|---|---|---|---|---|
| $r_1 =$ | 53,068 | | | | |
| $d_1 =$ | 6.75 | $n_1 =$ | 1.6584 | $\nu_1 =$ | 50.9 |
| $r_2 =$ | 273.055 | | | | |
| $d_2 =$ | 0.338 | | | | |
| $r_3 =$ | 65.32 | | | | |
| $d_3 =$ | 5.4 | $n_2 =$ | 1.6584 | $\nu_2 =$ | 50.9 |
| $r_4 =$ | 68.942 | | | | |
| $d_4 =$ | 0.338 | | | | |
| $r_5 =$ | 31.127 | | | | |
| $d_5 =$ | 5.4 | $n_3 =$ | 1.67 | $\nu_3 =$ | 57.3 |
| $r_6 =$ | 44.587 | | | | |
| $d_6 =$ | 2.7 | $n_4 =$ | 1.7408 | $\nu_4 =$ | 27.8 |
| $r_7 =$ | 22.441 | | | | |
| $d_7 =$ | 26.326 | | | | |
| $r_8 =$ | −19.531 | | | | |
| $d_8 =$ | 5.4 | $n_5 =$ | 1.64 | $\nu_5 =$ | 60.3 |

-continued

| | | | | | |
|---|---|---|---|---|---|
| $r_9 =$ | −16.537 | | | | |
| $d_9 =$ | 2.363 | $n_6 =$ | 1.5927 | $\nu_6 =$ | 35.3 |
| $r_{10} =$ | −28.173 | | | | |
| $d_{10} =$ | 0.338 | | | | |
| $r_{11} =$ | −90.903 | | | | |
| $d_{11} =$ | 8.775 | $n_7 =$ | 1.7432 | $\nu_7 =$ | 49.4 |
| $r_{12} =$ | −39.143 | | | | |

$f_a = 98.9$, $f_{II}/f_I = 0.846$

Embodiment 3

F/2, $2\omega = 50°$, $f = 100$

| | | | | | |
|---|---|---|---|---|---|
| $r_1 =$ | 44.506 | | | | |
| $d_1 =$ | 9.212 | $n_1 =$ | 1.6031 | $\nu_1 =$ | 60.7 |
| $r_2 =$ | 120.873 | | | | |
| $d_2 =$ | 0.329 | | | | |
| $r_3 =$ | 44.95 | | | | |
| $d_3 =$ | 5.264 | $n_2 =$ | 1.6031 | $\nu_2 =$ | 60.7 |
| $r_4 =$ | 75.714 | | | | |
| $d_4 =$ | 0.329 | | | | |
| $r_5 =$ | 34.01 | | | | |
| $d_5 =$ | 2.303 | $n_3 =$ | 1.5927 | $\nu_3 =$ | 35.3 |
| $r_6 =$ | 17.994 | | | | |
| $d_6 =$ | 3.948 | $n_4 =$ | 1.713 | $\nu_4 =$ | 53.9 |
| $r_7 =$ | 20.178 | | | | |
| $d_7 =$ | 24.346 | | | | |
| $r_8 =$ | −20.661 | | | | |
| $d_8 =$ | 2.632 | $n_5 =$ | 1.74 | $\nu_5 =$ | 31.7 |
| $r_9 =$ | −64.297 | | | | |
| $d_9 =$ | 0.329 | | | | |
| $r_{10} =$ | −62.544 | | | | |
| $d_{10} =$ | 5.264 | $n_6 =$ | 1.6516 | $\nu_6 =$ | 58.7 |
| $r_{11} =$ | −30.053 | | | | |
| $d_{11} =$ | 1.645 | | | | |
| $r_{12} =$ | −96.008 | | | | |
| $d_{12} =$ | 7.567 | $n_7 =$ | 1.757 | $\nu_7 =$ | 47.9 |
| $r_{13} =$ | −37.835 | | | | |

$f_a = 133.1$, $f_{II}/f_I = 1.36$

Embodiment 4

F/2, $2\omega = 50°$, $f = 100$

| | | | | | |
|---|---|---|---|---|---|
| $r_1 =$ | 43.438 | | | | |
| $d_1 =$ | 9.03 | $n_1 =$ | 1.6031 | $\nu_1 =$ | 60.7 |
| $r_2 =$ | 86.163 | | | | |
| $d_2 =$ | 0.323 | | | | |
| $r_3 =$ | 47.66 | | | | |
| $d_3 =$ | 5.16 | $n_2 =$ | 1.6031 | $\nu_2 =$ | 60.7 |
| $r_4 =$ | 94.984 | | | | |
| $d_4 =$ | 0.323 | | | | |
| $r_5 =$ | 31.502 | | | | |
| $d_5 =$ | 2.258 | $n_3 =$ | 1.5927 | $\nu_3 =$ | 35.3 |
| $r_6 =$ | 16.622 | | | | |
| $d_6 =$ | 3.87 | $n_4 =$ | 1.734 | $\nu_4 =$ | 51.5 |
| $r_7 =$ | 19.767 | | | | |
| $d_7 =$ | 24.51 | | | | |
| $r_8 =$ | −19.187 | | | | |
| $d_8 =$ | 2.58 | $n_5 =$ | 1.7495 | $\nu_5 =$ | 35.2 |
| $r_9 =$ | −90.487 | | | | |
| $d_9 =$ | 5.16 | $n_6 =$ | 1.6385 | $\nu_6 =$ | 55.4 |
| $r_{10} =$ | −27.870 | | | | |
| $d_{10} =$ | 1.613 | | | | |
| $r_{11} =$ | −92.546 | | | | |
| $d_{11} =$ | 7.418 | $n_7 =$ | 1.757 | $\nu_7 =$ | 47.9 |
| $r_{12} =$ | −36.289 | | | | |

$f_a = 93.6$, $f_{II}/f_I = 1.542$ wherein the reference symbols $r_1$, $r_2$, represent radii of curvature on surfaces of the lens elements, the reference symbols $d_1$, $d_2$, . . . denote thicknesses of the lens elements and airspaces, the reference symbols $n_1$, $n_2$, . . . designate refractive indices of the lens elements and the reference symbols $\nu_1$, $\nu_2$, . . . represent Abbe's numbers of the lens elements.

Figure 2:
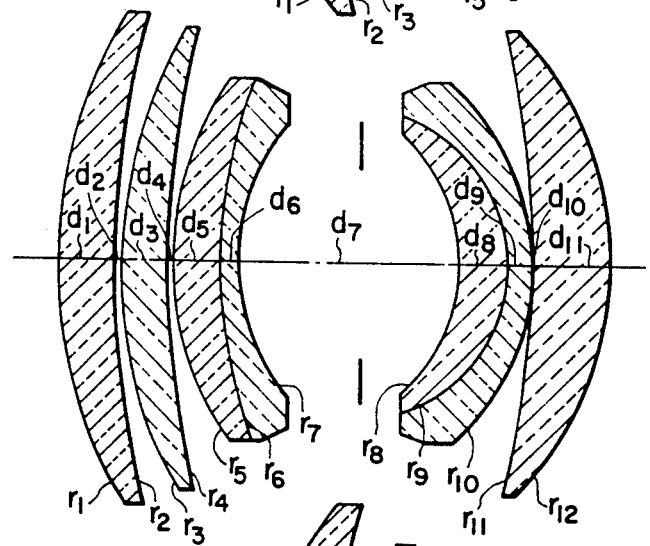

The numerical data exemplified above show values for enlarging lens systems which are designed for a magnification of 4×. Of the embodiments described above, the embodiments 1 and 4 have the composition illustrated in FIG. 1 wherein the third lens component has a convex lens arranged on the side of the stop and the fourth lens component comprises a concave lens arranged on the side of the stop. In these two embodiments, therefore, the reference symbols $n_a$, $n_b$, $n_c$ and $n_d$ represent $n_4$, $n_3$, $n_5$ and $n_6$ respectively, and the reference symbol $f_a$ denotes the focal length of the third lens component. In the embodiment 2 which has the composition illustrated in FIG. 2, the fourth lens component has a convex lens arranged on the side of the stop and the third lens component comprises a concave lens arranged on the side of the stop. That is to say, the reference symbols $n_a$, $n_b$, $n_c$ and $n_d$ represent $n_5$, $n_6$, $n_4$ and $n_3$ respectively, and the reference symbol $f_a$ denotes the focal length of the fourth lens component.

Figure 3:
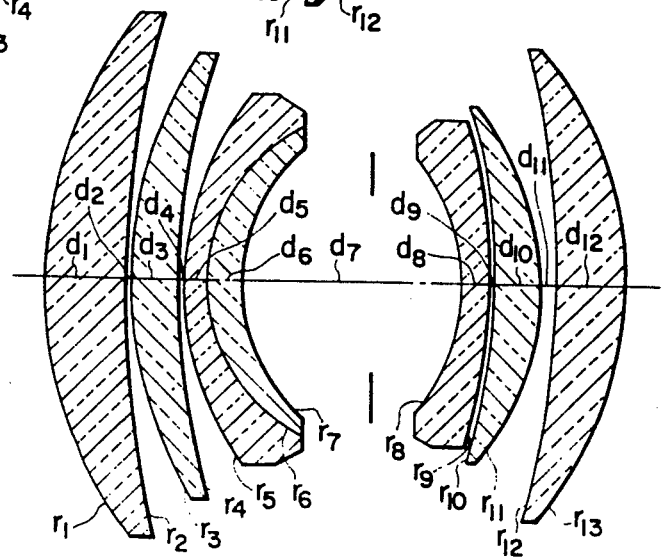

In the embodiment 3 shown in FIG. 3, the third lens component has a convex lens arranged on the side of the stop and the fourth lens component which comprises a concave lens on the side of the stop consists, unlike the fourth lens component in the other embodiment, of two lenses arranged with a narrow airspace interposed therebetween. In the embodiment 3, therefore, the reference symbols $n_a$, $n_b$, $n_c$ and $n_d$ represent $n_4$, $n_3$, $n_5$ and $n_6$ respectively and the reference symbol $f_a$ denotes the focal length of the third lens component.

The embodiment 1 is designed in such a way that the airspace $d_2$ is adjustable by displacing the first lens component toward the second lens component for correcting aberrations when the lens system is used for photographing at magnifications other than its design level. In this embodiment, $d_2$ can be varied from 1.33 (for the design magnification exemplified in the numerical data) to 0.20 (for a magnification of 8×). The aberration characteristics at magnifications (8×) other than the design level are illustrated in FIG. 8A, through FIG. 9B, of which FIG. 8A and FIG. 8B show aberration characteristic without correction, while FIG. 9A and FIG. 9B illustrate aberration characteristic corrected by displacing the first lens component toward the second lens component.

I claim:

1. An enlarging lens system comprising five components of seven lenses: a first positive meniscus lens component, a second positive meniscus lens component, a third lens component consisting of two lens elements, a fourth lens component consisting of two lens elements arranged after a stop and a fifth positive lens component, at least one of said third or fourth components including a positive lens, the concave face of which is adjacent and faced to said stop, and said enlarging lens system satisfying the following conditions:

$n_b < n_a$ (1)

$0.8f < f_a < 2.5f$ (2)

$0.04 < n_c − n_d < 0.12$ (3)

$n_7 > 1.70$, $\nu_7 > 46$ (4)

$0.6 < f_{II}/f_I < 1.6$ (5)

wherein the reference symbol $n_a$ represents the refractive index of the positive lens which is comprised in the third or fourth component and is adjacent to said stop, the reference symbol $n_b$ denotes the refractive index of a negative lens which is cemented with said positive lens which is adjacent to said stop, reference symbol $f_a$ designates the focal length of the cemented doublet which includes said positive lens which is adjacent to said stop, the reference symbols $n_c$ and $n_d$ represent refractive indices of the lens elements of the third or fourth components which includes a negative lens arranged on the side of said stop ($n_c$ represents the refractive index of the lens element which is adjacent to said stop), the reference symbols $n_7$ and $\nu_7$ denote the refractive index and Abbe's number of the fifth lens component, the reference symbols $f_I$ and $f_{II}$ denote the total focal lengths of the front and rear lens groups which are arranged before and after said stop respectively, and reference symbol $f$ designates the focal length of the enlarging lens system as a whole.

2. An enlarging lens system comprising according to claim 1 above which additionally satisfies the following condition:

$$0.22f < d_s < 0.28f$$

wherein the reference symbol $d_s$ represents the airspace reserved between the front and rear lens groups which are arranged before and after said stop respectively.

3. An enlarging lens system comprising a first positive meniscus lens component, a second positive meniscus lens component, a third cemented doublet lens component consisting of a negative lens element and a positive lens element, a fourth cemented doublet lens arranged after a stop and consisting of a negative lens element and a positive lens element, and a fifth positive lens component, and said enlarging lens system having the following numerical data:

| F/3.5 , 2ω = 50°, f = 100 | | | |
|---|---|---|---|
| $r_1$ = 42.015 | | | |
| $d_1$ = 8.0 | $n_1$ = 1.5687 | $v_1$ = 63.2 |
| $r_2$ = 90.339 | | | |
| $d_2$ = 1.33 | | | |
| $r_3$ = 47.244 | | | |
| $d_3$ = 5.67 | $n_2$ = 1.5687 | $v_2$ = 63.2 |
| $r_4$ = 97.570 | | | |
| $d_4$ = 0.4 | | | |
| $r_5$ = 31.282 | | | |
| $d_5$ = 2.27 | $n_3$ = 1.5927 | $v_3$ = 35.3 |
| $r_6$ = 18.893 | | | |
| $d_6$ = 3.87 | $n_4$ = 1.67 | $v_4$ = 57.3 |
| $r_7$ = 19.960 | | | |
| $d_7$ = 23.67 | | | |
| $r_8$ = −19.456 | | | |
| $d_8$ = 2.0 | $n_5$ = 1.74 | $v_5$ = 31.7 |
| $r_9$ = −100.159 | | | |
| $d_9$ = 6.67 | $n_6$ = 1.686 | $v_6$ = 49.2 |
| $r_{10}$ = −29.407 | | | |
| $d_{10}$ = 0.27 | | | |
| $r_{11}$ = −82.624 | | | |
| $d_{11}$ = 7.47 | $n_7$ = 1.757 | $v_7$ = 47.9 |
| $r_{12}$ = −35.199 | | | |
| $f_a$ = 214.5 , $f_{II}/f_I$ = 1.25 | | | | wherein the reference symbols $r_1$ through $r_{12}$ represent radii of curvature on surfaces of the lens elements, the reference symbols $d_1$ through $d_{11}$ denote thickness of the lens elements and airspaces, the reference symbols $n_1$ through $n_7$ designate refractive indices of the lens elements, the reference symbols $v_1$ through $v_7$ represent Abbe's numbers of the lens elements, the reference symbol $f_a$ denotes the focal length of the third lens component, the reference symbol $f_I$ designates the focal length of the front lens group arranged before said stop and the reference symbol $f_{II}$ represents the focal length of the rear lens group arranged after said stop.

4. An enlarging lens system comprising a first positive meniscus lens component, a second positive meniscus lens component, a third cemented doublet lens component consisting of a positive lens element and a negative lens element, a fourth cemented doublet lens component arranged after a stop and consisting of a positive lens element and a negative lens element and a fifth positive lens component, and said enlarging lens system having the following numerical data:

| F/3.5 , 2ω = 50°, f = 100 | | | |
|---|---|---|---|
| $r_1$ = 53.068 | | | |
| $d_1$ = 6.75 | $n_1$ = 1.6584 | $v_1$ = 50.9 |
| $r_2$ = 273.055 | | | |
| $d_2$ = 0.338 | | | |
| $r_3$ = 65.32 | | | |

-continued

| | | | |
|---|---|---|---|
| $d_3$ = 5.4 | $n_2$ = 1.6584 | $v_2$ = 50.9 |
| $r_4$ = 68.942 | | | |
| $d_4$ = 0.338 | | | |
| $r_5$ = 31.127 | | | |
| $d_5$ = 5.4 | $n_3$ = 1.67 | $v_3$ = 57.3 |
| $r_6$ = 44.587 | | | |
| $d_6$ = 2.7 | $n_4$ = 1.7408 | $v_4$ = 27.8 |
| $r_7$ = 22.441 | | | |
| $d_7$ = 26.326 | | | |
| $r_8$ = −19.531 | | | |
| $d_8$ = 5.4 | $n_5$ = 1.64 | $v_5$ = 60.3 |
| $r_9$ = −16.537 | | | |
| $d_9$ = 2.363 | $n_6$ = 1.5927 | $v_6$ = 35.3 |
| $r_{10}$ = −28.173 | | | |
| $d_{10}$ = 0.338 | | | |
| $r_{11}$ = −90.903 | | | |
| $d_{11}$ = 8.775 | $n_7$ = 1.7432 | $v_7$ = 49.4 |
| $r_{12}$ = −39.143 | | | |
| $f_a$ = 98.9 , $f_{II}/f_I$ = 0.846 | | | | wherein the reference symbols $r_1$ through $r_{12}$ represent radii of curvature on surfaces of the lens elements, the reference symbols $d_1$ through $d_{11}$ denote thickness of the lens elements and airspaces, the reference symbols $n_1$ through $n_7$ designate refractive indices of the lens elements, the reference symbols $v_1$ through $v_7$ represent Abbe's numbers of the lens elements, the reference symbol $f_a$ denotes the focal length of the fourth lens component, the reference symbol $f_I$ designates the focal length of the front lens group arranged before said stop and the reference symbol $f_{II}$ represents the focal length of the rear lens group arranged after said stop.

5. An enlarging lens system comprising a first positive meniscus lens component, a second positive meniscus lens component, a third cemented doublet lens component consisting of a negative lens element and a positive lens element, a fourth lens component arranged after a stop and consisting of a negative lens element and a positive lens element which are arranged with a narrow airspace interposed therebetween and a fifth positive lens component, and said enlarging lens system having the following numerical data:

| F/2 , 2ω = 50°, f = 100 | | | |
|---|---|---|---|
| $r_1$ = 44.506 | | | |
| $d_1$ = 9.212 | $n_1$ = 1.6031 | $v_1$ = 60.7 |
| $r_2$ = 120.873 | | | |
| $d_2$ = 0.329 | | | |
| $r_3$ = 44.95 | | | |
| $d_3$ = 5.264 | $n_2$ = 1.6031 | $v_2$ = 60.7 |
| $R_4$ = 75.714 | | | |
| $d_4$ = 0.329 | | | |
| $r_5$ = 34.01 | | | |
| $d_5$ = 2.303 | $n_3$ = 1.5927 | $v_3$ = 35.3 |
| $r_6$ = 17.994 | | | |
| $d_6$ = 3.948 | $n_4$ = 1.713 | $v_4$ = 53.9 |
| $r_7$ = 20.178 | | | |
| $d_7$ = 24.346 | | | |
| $r_8$ = −20.661 | | | |
| $d_8$ = 2.632 | $n_5$ = 1.74 | $v_5$ = 31.7 |
| $r_9$ = −64.297 | | | |
| $d_9$ = 0.329 | | | |
| $r_{10}$ = −62.544 | | | |
| $d_{10}$ = 5.264 | $n_6$ = 1.6516 | $v_6$ = 58.7 |
| $r_{11}$ = −30.053 | | | |
| $d_{11}$ = 1.645 | | | |
| $r_{12}$ = −96.008 | | | |
| $d_{12}$ = 7.567 | $n_7$ = 1.757 | $v_7$ = 47.9 |
| $r_{13}$ = −37.835 | | | |
| $f_a$ = 133.1 , $f_{II}/f_I$ = 1.36 | | | | wherein the reference symbols $r_1$ through $r_{13}$ represent radii of curvature on surfaces of the lens elements, the reference symbols $d_1$ through $d_{12}$ denote thickness of the lens elements and airspaces, the reference symbols $n_1$ through $n_7$ designate refractive indices of the lens elements, the reference symbols $v_1$ through $v_7$ represent Abbe's numbers of the lens elements, the reference symbol $f_a$ denotes the focal length of the third lens component, the reference symbol $f_I$ designates the focal length of the front lens group arranged before said stop and the reference symbol $f_{II}$ represents the focal length of the rear lens group arranged after said stop.

6. An enlarging lens system comprising a first positive meniscus lens component, a second positive meniscus lens component, a third cemented doublet lens component consisting of a negative lens element and a positive lens element, a fourth cemented doublet lens arranged after a stop and consisting of a negative lens element and a positive lens element, and a fifth positive lens component, and said enlarging lens system having the following numerical data:

| F/2, 2ω = 50°, f = 100 | | | |
|---|---|---|---|
| $r_1 =$ | 43.438 | | |
| $d_1 =$ | 9.03 | $n_1 =$ 1.6031 | $\nu_1 =$ 60.7 |
| $r_2 =$ | 86.163 | | |
| $d_2 =$ | 0.323 | | |
| $r_3 =$ | 47.66 | | |
| $d_3 =$ | 5.16 | $n_2 =$ 1.6031 | $\nu_2 =$ 60.7 |
| $r_4 =$ | 94.984 | | |
| $d_4 =$ | 0.323 | | |
| $r_5 =$ | 31.502 | | |
| $d_5 =$ | 2.258 | $n_3 =$ 1.5927 | $\nu_3 =$ 35.3 |
| $r_6 =$ | 16.622 | | |
| $d_6 =$ | 3.87 | $n_4 =$ 1.734 | $\nu_4 =$ 51.5 |
| $r_7 =$ | 19.767 | | |
| $d_7 =$ | 24.51 | | |
| $r_8 =$ | −19.187 | | |
| $d_8 =$ | 2.58 | $n_5 =$ 1.7495 | $\nu_5 =$ 35.2 |
| $r_9 =$ | −90.487 | | |
| $d_9 =$ | 5.16 | $n_6 =$ 1.6385 | $\nu_6 =$ 55.4 |
| $r_{10} =$ | −27.870 | | |
| $d_{10} =$ | 1.613 | | |
| $r_{11} =$ | −92.546 | | |
| $d_{11} =$ | 7.418 | $n_7 =$ 1.757 | $\nu_7 =$ 47.9 |
| $r_{12} =$ | −36.289 | | |
| $f_a = 93.6$, $f_{II}/f_I = 1.542$ | | | | wherein the reference symbols $r_1$ through $r_{12}$ represent radii of curvature on surfaces of the lens elements, the reference symbols $d_1$ through $d_{11}$ denote thickness of the lens elements and airspaces, the reference symbols $n_1$ through $n_7$ designate refractive indices of the lens elements, the reference symbols $\nu_1$ through $\nu_7$ represent Abbe's numbers of the lens elements, the reference symbol $f_a$ denotes the focal length of the third lens component, the reference symbol $f_I$ designates the focal length of the front lens group arranged before said stop and the reference symbol $f_{II}$ represents the focal length of the rear lens group arranged after said stop.

* * * * *